W. F. BELL.
DOUBLE ACTION PUMP.
APPLICATION FILED DEC. 14, 1917.
1,379,515.
Patented May 24, 1921.
3 SHEETS—SHEET 3.
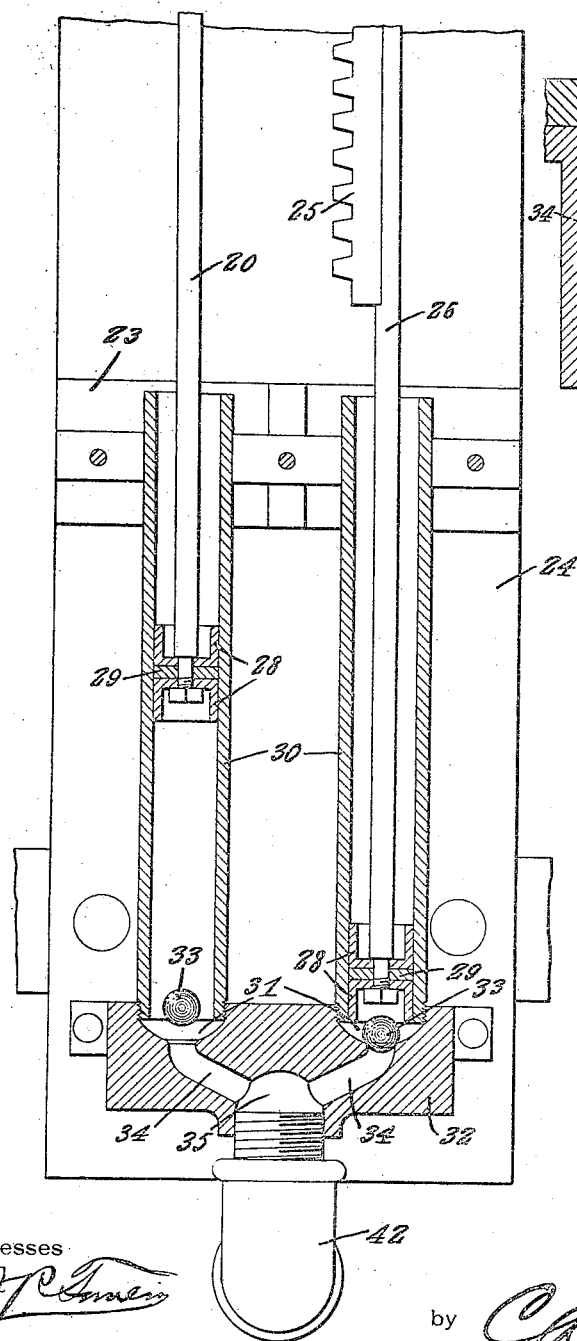
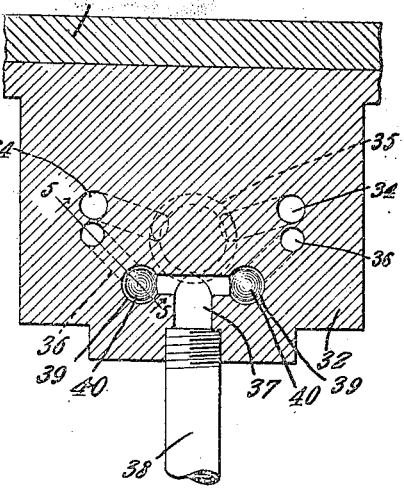
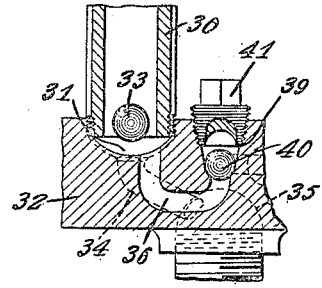
W. F. Bell, Inventor

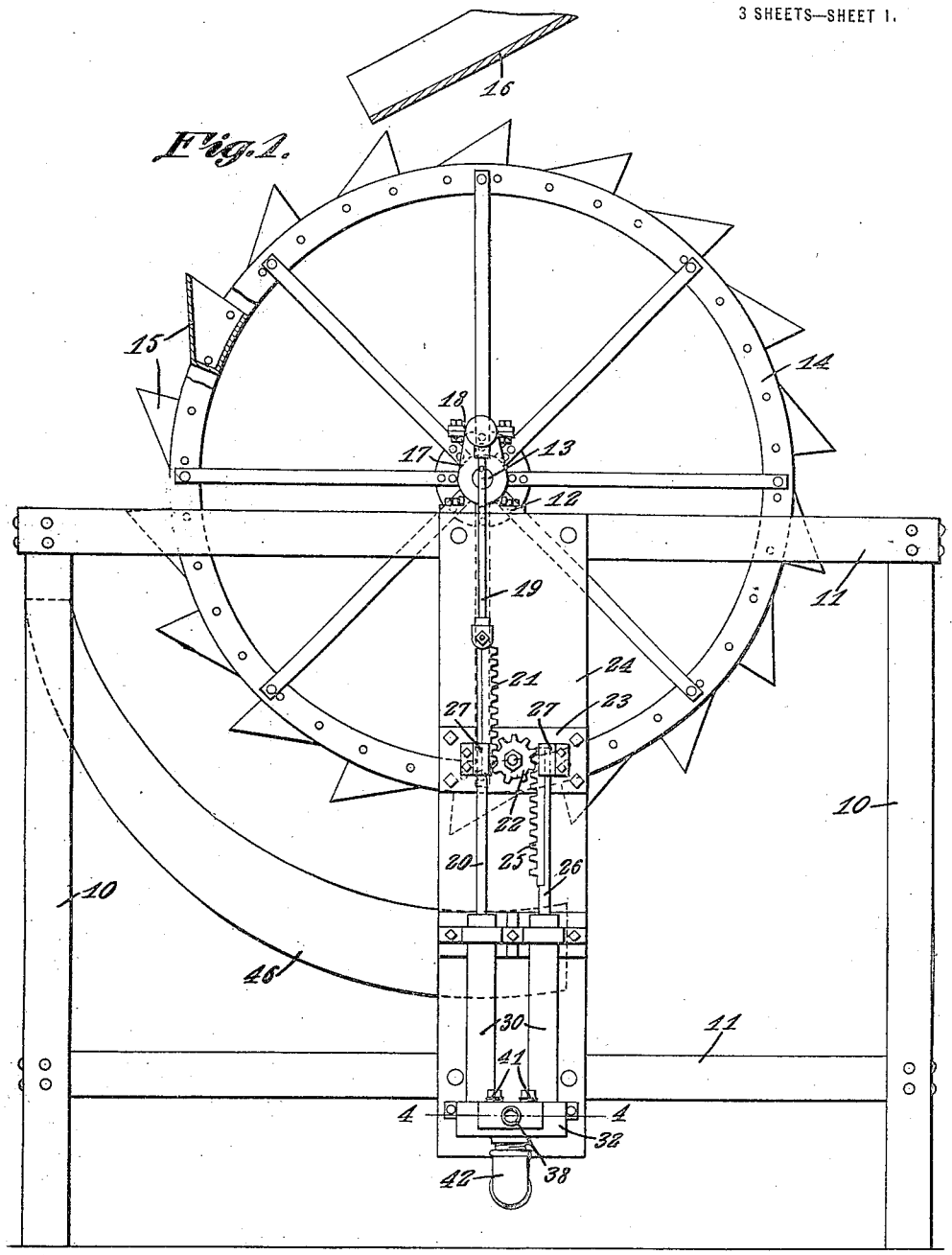

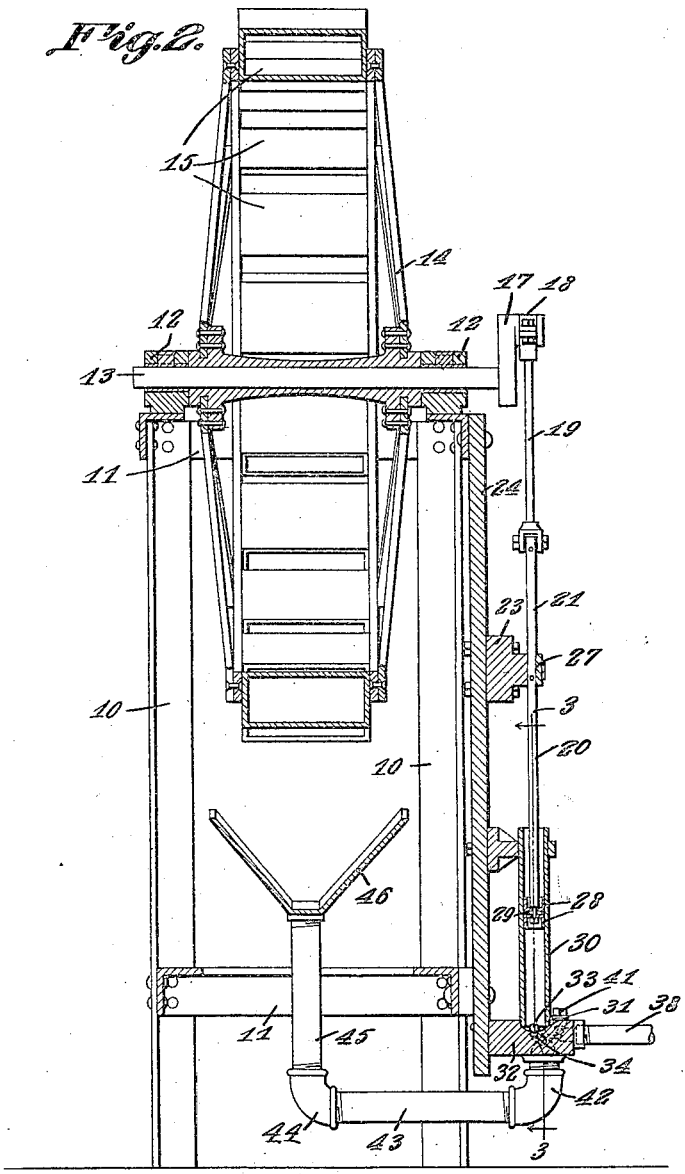

UNITED STATES PATENT OFFICE.

WILLIAM F. BELL, OF CANTON, NORTH CAROLINA.

DOUBLE-ACTION PUMP.

1,379,515.     Specification of Letters Patent.     Patented May 24, 1921.

Application filed December 14, 1917. Serial No. 207,148.

*To all whom it may concern:*

Be it known that I, WILLIAM F. BELL, a citizen of the United States, residing at Canton, in the county of Haywood and State of North Carolina, have invented a new and useful Double-Action Pump, of which the following is a specification.

The subject of this invention is a pump, and the objects of the invention are, first, to provide a pump applicable, where there is a flow of water, to raise a portion of such flowing water, second, to provide a pump producing a steady flow of water, third, to provide an economical and automatic pump, fourth, to provide a simple, durable and efficient pump.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawings, wherein:—

Figure 1 is a side elevation of a pump constructed in accordance with the invention, portions being in section;

Fig. 2 is a central vertical transverse section;

Fig. 3 is an enlarged detail sectional view taken on the line 3—3 of Fig. 2;

Fig. 4 is a similar view taken on the line 4—4 of Fig. 1;

Fig. 5 is an enlarged detail sectional view taken on the line 5—5 of Fig. 4.

Referring to the drawings by numerals of reference:—

In carrying out the invention a suitable support is provided consisting of uprights 10 which are joined by the horizontal tie pieces 11. Bolted or otherwise secured to the upper tie pieces 11 are the journaling blocks 12 in which is journaled the shaft 13 of a water wheel 14, herein shown as of the overshot type and provided with buckets 15 adapted to receive water from a spout 16 or the like. A crank 17 is rigid on the shaft 13 and its pin turns in the bearing 18 of a pitman 19.

The pitman 19 has pivotal connection with the upper end of a plunger rod 20 of a pump which rod has a rack 21 formed longitudinally of its upper end and meshing with a pinion 22 which is journaled on a block 23 which is bolted or otherwise secured to a support 24 which support is secured to the upper and lower tie pieces at one side of the frame.

The pinion 22 also meshes with a rack 25 which extends longitudinally of the upper end of a plunger rod 26. By this means motion is imparted from one plunger to another and in an opposite direction. The plunger rods 20 and 26 reciprocate through guides 27 which are fast to the block 23. At the lower end of the plunger rod 20, and the plunger rod 26 are flexible cup washers 28, the upper one turned up and the lower one turned down and a rigid washer 29 interposed between them. These form the plungers of the pump and are designed to reduce binding as the cup washers on the side from which the plunger is traveling will contract and cease to bind the cylinder.

The plunger rods 20 and 26 with their plungers work in pump cylinders 30—30. These cylinders are threaded into counter sinks 31—31 formed in the upper face of a block 32, which is secured to the lower end of the support 24. The bottoms of the countersinks 31 are concaved to guide the balls 33 to seat within the orifices of ducts 34 which lead from the bottoms of the countersinks 31 to a countersink 35 formed in the lower face of the block 32. Ducts 36 also lead from the countersinks 31 toward the front face of the block 32 and the forward ends of these ducts are in communication with a bore 37 formed in the block 32 and into which is threaded a discharge pipe 38. The block 32 is bored as at 39—39 to tap the ducts 36 and form a space for the balls 40—40 which provide check valves in said ducts. The bores 39 are tapped to receive the plugs 41 which may be adjusted to regulate the distance which the ball valves 40 may leave their seats.

The nipple of an elbow 42 is threaded into the countersink 35 and a horizontal joint connects this elbow with an elbow 44 from which rises a joint of pipe 45 the upper end of which is threaded into the bottom of a trough like spillway 46 which is suitably supported within the supporting frame and underlies the water wheel 14.

Water is delivered from a suitable source of supply and directed by the spout 16 into the buckets 15 of the water-wheel. As the wheel revolves the buckets will empty into the trough like spillway 46 and some will pass into the pipe 45, joint 43; countersink 35; and ducts 34; from whence it will be sucked by the plungers, on their upward strokes, into the cylinders 30, to be expelled on the down strokes of the plungers through the ducts 36 and discharge pipe 38 to the points at which delivery is desired. The surplus water delivered to the spillway 46 is conducted off by any suitable means not shown.

Having thus described the invention, what is claimed as new and sought by Letters Patent is:—

In a device of the class described, a support; a block carried by the support and provided in its upper face with countersinks and having a countersink in its lower face, there being first ducts in the block connecting the upper countersinks with the lower countersink, the block being supplied with a bore in its forward face, and with second ducts connecting the upper countersinks with the bore, the block having openings communicating with the second ducts; ball valves in the openings and coöperating with the second ducts; closures in the openings and adjustable to vary the travel of the valves; ball valves in the upper countersinks and coöperating with the upper ends of the first ducts; cylinders communicating with the upper countersinks; a discharge pipe communicating with the lower countersink; pistons mounted to reciprocate in the cylinders; and means on the support for operating the pistons.

In testimony that I claim the foregoing as my own, I have hereto affixed my signature in the presence of two witnesses.

WILLIAM F. BELL.

Witnesses:
W. H. KEZZIAH,
J. R. HALL.